United States Patent
Yasuda et al.

(10) Patent No.: US 12,227,814 B2
(45) Date of Patent: Feb. 18, 2025

(54) STEEL MATERIAL FOR LINE PIPES, METHOD FOR PRODUCING THE SAME, LINE PIPE, AND METHOD FOR PRODUCING THE LINE PIPE

(71) Applicant: JFE Steel Corporation, Tokyo (JP)

(72) Inventors: Kyono Yasuda, Tokyo (JP); Junji Shimamura, Tokyo (JP); Ryuji Muraoka, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 580 days.

(21) Appl. No.: 17/440,952

(22) PCT Filed: Mar. 19, 2020

(86) PCT No.: PCT/JP2020/012169
§ 371 (c)(1),
(2) Date: Sep. 20, 2021

(87) PCT Pub. No.: WO2020/196214
PCT Pub. Date: Oct. 1, 2020

(65) Prior Publication Data
US 2022/0220574 A1    Jul. 14, 2022

(30) Foreign Application Priority Data

Mar. 28, 2019    (JP) .................. 2019-062703

(51) Int. Cl.
| | | |
|---|---|---|
| *C21D 9/08* | (2006.01) |
| *B05D 7/14* | (2006.01) |
| *C21D 6/00* | (2006.01) |
| *C21D 8/10* | (2006.01) |
| *C22C 38/00* | (2006.01) |
| *C22C 38/02* | (2006.01) |
| *C22C 38/06* | (2006.01) |
| *C22C 38/24* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/58* | (2006.01) |

(52) U.S. Cl.
CPC ............ *C21D 9/085* (2013.01); *B05D 7/146* (2013.01); *C21D 6/004* (2013.01); *C21D 6/005* (2013.01); *C21D 6/008* (2013.01); *C21D 8/105* (2013.01); *C22C 38/002* (2013.01); *C22C 38/02* (2013.01); *C22C 38/06* (2013.01); *C22C 38/24* (2013.01); *C22C 38/42* (2013.01); *C22C 38/44* (2013.01); *C22C 38/48* (2013.01); *C22C 38/50* (2013.01); *C22C 38/58* (2013.01)

(58) Field of Classification Search
CPC ... C21D 1/02; C21D 1/19; C21D 1/25; C21D 1/34; C21D 1/42; C21D 2211/002; C21D 6/004; C21D 6/005; C21D 6/008; C21D 8/02; C21D 8/021; C21D 8/0226; C21D 8/0236; C21D 8/0263; C21D 8/105; C21D 9/085; C21D 9/46; C22C 38/00; C22C 38/002; C22C 38/02; C22C 38/04; C22C 38/06; C22C 38/08; C22C 38/12; C22C 38/14; C22C 38/16; C22C 38/22; C22C 38/24; C22C 38/26; C22C 38/38; C22C 38/42; C22C 38/44; C22C 38/48; C22C 38/50; C22C 38/58; B05D 7/146; F16L 9/02; Y02P 10/25

See application file for complete search history.

(56) References Cited

U.S. PATENT DOCUMENTS

| | | | |
|---|---|---|---|
| 8,435,363 B2 * | 5/2013 | Sun .................. | C22C 38/04 148/540 |
| 10,640,841 B2 | 5/2020 | Kimura et al. | |
| 2012/0305122 A1 | 12/2012 | Ishikawa et al. | |

FOREIGN PATENT DOCUMENTS

| | | |
|---|---|---|
| CN | 101448967 A | 6/2009 |
| CN | 103348030 A | 10/2013 |
| CN | 106133175 A | 11/2016 |
| CN | 107429351 A | 12/2017 |
| CN | 108603266 A | 9/2018 |
| EP | 1870484 A1 | 12/2007 |
| EP | 2039793 A1 | 3/2009 |
| EP | 3081662 A1 | 10/2016 |
| EP | 3128029 A1 | 2/2017 |

(Continued)

OTHER PUBLICATIONS

Tsuru et al., "Forming and Buckling Simulation on High-Strength UOE Pipe with Plastic Anisotropy", Nippon Steel Technical Report, No. 102, 2013, 9 pages.
Arakawa et al. "Development of High Performance UOE Pipe for Linepipe", JFE Technical Report No. 18, 2013, 13 pages.
Autorenkollektiv: "Spurenelemente im Stahl—Moeglichkeiten Zur Beeinflussung im Smelzbetrieb" Trace Elements in steel-possibilities for influencing the smelting operation, Spurenelemente in Staehlen, Verlag Stahleisen, Duesseldorf, DE with partial translation, 1985, 2 pages.

(Continued)

*Primary Examiner* — Yan Lan
(74) *Attorney, Agent, or Firm* — Buchanan Ingersoll & Rooney PC

(57) ABSTRACT

A steel material for line pipes has a specific composition. The metallic microstructure of the steel material at a ⅛-plate thickness position below the surface includes bainite of an area fraction of 85% or more, polygonal ferrite of an area fraction of 10% or less, and martensite-austenite constituent of an area fraction of 5% or less. The 0.23% compressive strength of a portion of the steel material which extends from the surface to the ⅛-plate thickness position in a transverse direction is 340 MPa or more. The temperature at which a percent ductile fracture of the steel material measured in a DWTT test becomes 85% or more is −10° C. or less.

16 Claims, No Drawings

(56) References Cited

FOREIGN PATENT DOCUMENTS

| | | | |
|---|---|---|---|
| EP | 3276020 | A1 | 1/2018 |
| EP | 3276024 | A1 | 1/2018 |
| EP | 3276025 | A1 | 1/2018 |
| EP | 3409804 | A1 | 12/2018 |
| JP | 0949025 | A | 2/1997 |
| JP | 2002102931 | A | 4/2002 |
| JP | 2003340519 | A | 12/2003 |
| JP | 2003342639 | A | 12/2003 |
| JP | 2004035925 | A | 2/2004 |
| JP | 2006124775 | A | 5/2006 |
| JP | 2006207028 | A | 8/2006 |
| JP | 2008056962 | A | 3/2008 |
| JP | 2009052137 | A | 3/2009 |
| JP | 2010235993 | A | 10/2010 |
| JP | 2011132601 | A | 7/2011 |
| JP | 2012167329 | A | 9/2012 |
| JP | 2012241271 | A | 12/2012 |
| JP | 2012241273 | A | 12/2012 |
| JP | 2018168411 | A | 11/2018 |
| WO | 2016157863 | A1 | 10/2016 |

OTHER PUBLICATIONS

Chinese Office Action for Chinese Application No. 202080024929.1, dated May 7, 2022 with Concise Statement of Relevance of Office Action, 14 pages.

Extended European Search Report for European Application No. 20779573.3, dated Apr. 14, 2022, 14 pages.

International Search Report and Written Opinion for International Application No. PCT/JP2020/012169, dated Jun. 23, 2020, 5 pages.

Canadian Examination Report for Canadian Application No. 3,134,477, dated Oct. 21, 2022, 4 pages.

European Communication pursuant to Article 94(3) for European Application No. 20 779 573.3, dated Jun. 20, 2023, 5 pages.

Korean Office Action for Korean Application No. 10-2021-7030966, dated Jun. 15, 2023 with Concise Statement of Relevance of Office Action, 7 pages.

Chinese Office Action for Chinese Application No. 202080024929.1, dated Dec. 27, 2022 with Concise Statement of Relevance of Office Action, 9 pages.

\* cited by examiner

STEEL MATERIAL FOR LINE PIPES, METHOD FOR PRODUCING THE SAME, LINE PIPE, AND METHOD FOR PRODUCING THE LINE PIPE

CROSS REFERENCE TO RELATED APPLICATIONS

This is the U.S. National Phase application of PCT/JP2020/012169, filed Mar. 19, 2020, which claims priority to Japanese Patent Application No. 2019-062703, filed Mar. 28, 2019, the disclosures of these applications being incorporated herein by reference in their entireties for all purposes.

FIELD OF THE INVENTION

The present invention relates to a steel material for line pipes, a method for producing the steel material for line pipes, a line pipe, and a method for producing the line pipe. The present invention relates to a steel material for line pipes which is suitable as a material for line pipes used for the transportation of oil and natural gas and is particularly suitable as a material for offshore pipelines, which are required to have a high collapse resistant performance, a method for producing the steel material for line pipes, such a line pipe, and a method for producing the line pipe. The term "compressive strength" used herein refers to 0.23% compressive proof strength, unless otherwise specified, and is also referred to as "compressive yield strength".

BACKGROUND OF THE INVENTION

With an increasing demand for energy, the development of oil and natural gas pipelines has been active. Various pipelines that extend across sea have been developed in order to cope with a situation where gas fields or oil fields are located at remoter places or versatility in transport routes. Line pipes used as offshore pipelines have a larger wall thickness than onshore pipelines in order to prevent collapse due to water pressure, and are required to have a high degree of roundness. In addition, as for the properties of offshore line pipes, the offshore line pipes need to have a high compressive strength in order to resist the compressive stress caused by external water pressure in the circumferential direction of the pipes.

Since the final step of a method for making UOE steel pipes includes a pipe expanding process, and after the pipes have been subjected to a tensile deformation in the circumferential direction of the pipes, the steel pipes are constructed on the sea bed and compressed by external water pressure in the circumferential direction of the pipes. Consequently, there is a problem that compressive yield strength will be reduced disadvantageously due to the Bauschinger effect.

There have been various studies of improvement of the collapse resistant performance of UOE steel pipes. Patent Literature 1 discloses a method in which a steel pipe is heated by Joule heating to expand the pipe and the temperature is subsequently held for a certain period of time or more. As a method in which heating is performed subsequent to the pipe expansion as described above in order to restore from the reduction in compressive yield strength caused by the Bauschinger effect, Patent Literature 2 proposes a method in which the outer surface of a steel pipe is heated to a temperature higher than that of the inner surface in order to restore from the impact due to the Bauschinger effect caused in the outer surface-side portion of the steel pipe which has been subjected to a tensile deformation and to maintain the strain hardening of the inner surface-side portion due to compression. Patent Literature 3 proposes a method in which, in a steel plate making process using a steel containing Nb and Ti, accelerated cooling is performed from a temperature equal to or greater than the $Ar_3$ transformation temperature to 300° C. or less subsequent to hot rolling and heating is performed after a steel pipe has been formed by the UOE process.

On the other hand, as a method in which the compressive strength of a steel pipe is increased by adjusting the conditions under which the steel pipe is formed, instead of performing heating subsequent to the pipe expansion, Patent Literature 4 discloses a method in which the compression rate at which compression is performed when a steel pipe is formed using the O-ing press is set to be higher than the expansion ratio at which pipe expansion is performed in the subsequent step.

Patent Literature 5 discloses a method in which the diameter of a steel pipe which passes through the vicinity of a weld zone, which has a lower compressive strength, and the position that forms an angle of 180° with respect to the weld zone is set to be the maximum diameter of the steel pipe in order to enhance the collapse resistant performance of the steel pipe.

Patent Literature 6 proposes a steel plate capable of limiting a reduction in yield stress due to the Bauschinger effect, which is produced by performing reheating subsequent to accelerated cooling to reduce the fraction of the hard second phase in the surface-layer portion of the steel plate.

Patent Literature 7 proposes a method for producing a high-strength steel plate for line pipes for sour gas service having a thickness of 30 mm or more, in which the surface-layer portion of a steel plate is heated in a reheating process performed subsequent to accelerated cooling while a rise in the temperature of the center of the steel plate is suppressed.

PATENT LITERATURE

PTL 1: Japanese Unexamined Patent Application Publication No. 9-49025
PTL 2: Japanese Unexamined Patent Application Publication No. 2003-342639
PTL 3: Japanese Unexamined Patent Application Publication No. 2004-35925
PTL 4: Japanese Unexamined Patent Application Publication No. 2002-102931
PTL 5: Japanese Unexamined Patent Application Publication No. 2003-340519
PTL 6: Japanese Unexamined Patent Application Publication No. 2008-56962
PTL 7: Japanese Unexamined Patent Application Publication No. 2009-52137

SUMMARY OF THE INVENTION

According to the method described in Patent Literature 1, dislocation introduced by the pipe expansion is recovered and, consequently, compressive strength is increased. However, this method requires the Joule heating to be continued for five minutes or more subsequent to the pipe expansion and is therefore poor in terms of productivity.

In the method described in Patent Literature 2, it is necessary to individually manage the temperatures at which the outer and inner surfaces of a steel pipe are heated and the amounts of time during which the outer and inner surfaces of the steel pipe are heated. This is difficult in terms of the actual manufacture. It is considerably difficult to manage the quality of steel pipes in a mass production process. The method described in Patent Literature 3 requires the accelerated cooling stop temperature in the production of a steel plate to be a low temperature of 300° C. or less. This increases the distortion of a steel plate and degrades the roundness of a steel pipe produced by the UOE process. Furthermore, since the accelerated cooling is performed from a temperature of the $Ar_a$ temperature or more, it is necessary to perform rolling at a relatively high temperature. This will result in the degradation of toughness.

According to the method described in Patent Literature 4, tensile pre-strain substantially does not occur in the circumferential direction of the pipe. Accordingly, the Bauschinger effect is not produced and a high compressive strength can be achieved. However, a low expansion ratio makes it difficult to maintain the roundness of a steel pipe and may degrade the collapse resistant performance of the steel pipe.

The portion of a pipeline which is required to have certain collapse resistant performance when the pipeline is actually constructed is a portion (sag-bend portion) subjected to a bending deformation when the pipe reaches the sea bed. When a pipeline is constructed on the sea bed, girth welding is performed without reference to the positions of weld zones of steel pipes. Therefore, even if steel pipes are produced by performing pipe forming and welding such that a cross section of each of the steel pipes has the maximum diameter at the seam weld zone as described in Patent Literature 5, it is not possible to determine the positions of the seam weld zones when a pipeline is actually constructed. Thus, the technology according to Patent Literature 5 does not produce any advantageous effects in reality.

The steel plate described in Patent Literature 6 needs to be heated in the reheating step until the center of the steel plate is heated. This may result in the degradation of a DWTT (drop weight tear test) property. Therefore, it is difficult to use this steel plate for producing deep-ocean thick-walled line pipes. In addition, the steel plate has room for improvement in terms of increase in the thickness of the steel plate. Moreover, the collapse resistant performance of a steel pipe is in correlation with the compression flow stress which is close to the elastic limit, and acts in the inner surface layer of the pipe. In Patent Literature 6, collapse resistant performance is determined at a ¼-plate thickness position. However, even when a steel pipe has a high compressive strength at a ¼-plate thickness position, the actual advantageous effect on the critical collapse pressure of the steel pipe is small.

According to the method described in Patent Literature 7, the fraction of the hard second phase in the surface-layer portion of a steel plate can be reduced while the degradation of a DWTT (drop weight tear test) property is limited. This may reduce the hardness of a surface-layer portion and inconsistencies in the material quality of the steel plate. Furthermore, the reduction in the fraction of the hard second phase may reduce the Bauschinger effect. However, in the technology described in Patent Literature 7, the surface of a steel plate is heated to 550° C. or more. This may reduce the compressive strength of the surface layer and consequently degrade collapse resistant performance.

Aspects of the present invention were made in view of the above-described circumstances. An object according to aspects of the present invention is to provide a steel material for line pipes having a heavy wall thickness, a certain compressive strength required for applying the steel material to offshore pipelines, excellent low-temperature toughness, an excellent DWTT property, and excellent collapse resistant performance, a method for producing the steel material for line pipes, a line pipe having the required compressive strength, excellent low-temperature toughness, an excellent DWTT property, and excellent collapse resistant performance, and a method for producing the line pipe.

Note that, the expression "having excellent collapse resistant performance" used herein means that, as for the steel material for line pipes, the 0.23% compressive strength of a portion of the steel material, the portion extending from the surface of the steel material to a ⅛-plate thickness position that is a position ⅛ of the thickness of the steel material below the surface, in the transverse direction (rolling orthogonal direction) is 340 MPa or more and, as for the line pipe, the 0.23% compressive strength of a portion of the line pipe, the portion extending from the inner surface of the line pipe to a ⅛-wall thickness position that is a position ⅛ of the wall thickness of the line pipe below the inner surface, in the circumferential direction at a major axis position of the pipe is 340 MPa or more and the collapse pressure of the line pipe is 35 MPa or more.

The inventors of the present invention conducted extensive studies in order to enhance collapse resistant performance and, as a result, found the following facts.

(a) The reduction in compressive strength due to the Bauschinger effect is induced by the back stress caused as a result of the accumulation of dislocations at the interfaces between different phases and in the hard second phase. For preventing this, first, it is effective to form a uniform microstructure in order to reduce the interfaces between the soft and hard phases, at which dislocations accumulate. Accordingly, forming a metallic microstructure composed primarily of bainite in which the formation of soft polygonal ferrite and hard martensite-austenite constituent is suppressed results in limiting the reduction in compressive strength due to the Bauschinger effect.

(b) It is difficult to completely inhibit the formation of the martensite-austenite constituent (hereinafter, may be referred to simply as "MA") in high-strength steel produced by accelerated cooling and, in particular, thick-walled steel plates used for producing offshore pipelines because such high-strength steel and thick-walled steel plates have high hardenability as a result of containing large amounts of alloying elements to achieve an intended strength. However, the reduction in compressive strength due to the Bauschinger effect can be limited when MA is decomposed into cementite by, for example, suppressing the formation of MA by chemical composition control or performing reheating subsequent to accelerated cooling. Although performing reheating more than necessary reduces compressive strength, the required compressive strength can be achieved by controlling the reheating temperature of the surface layer.

(c) While evaluation of compressive strength is commonly made on the basis of 0.5% compressive strength, collapse resistant performance is in correlation with 0.23% compressive strength, which is close to the elastic limit, of the inner surface layer of a line pipe. Thus, increasing the 0.23% compressive strength of a portion of a line pipe which extends from the inner surface of the pipe to a position ⅛ of the wall thickness below the inner surface will enhance collapse resistant performance.

Aspects of the present invention were made on the basis of the above findings and additional studies. The summary of aspects of the present invention is as follows.

[1] A steel material for line pipes, the steel material having a composition containing, by mass, C: 0.030% to 0.10%, Si: 0.01% to 0.15%, Mn: 1.0% to 2.0%, Nb: 0.005% to 0.050%, Ti: 0.005% to 0.025%, and Al: 0.08% or less, the composition further containing one or more elements selected from, by mass, Cu: 0.5% or less, Ni: 1.0% or less, Cr: 1.0% or less, Mo: 0.5% or less, and V: 0.1% or less, wherein a Ceq value represented by Formula (1) is 0.35 or more and a Pcm value represented by Formula (2) is 0.20 or less, with the balance being Fe and incidental impurities, wherein a metallic microstructure of the steel material at a ⅛-plate thickness position relative to a surface of the steel material includes bainite of an area fraction pf 85% or more, polygonal ferrite or an area fraction of 10% or less, and martensite-austenite constituent of an area fraction of 5% or less, and wherein a 0.23% compressive strength of a portion of the steel material, the portion extending from the surface of the steel material to the ⅛-plate thickness position, in a rolling orthogonal direction is 340 MPa or more, and a temperature at which a percent ductile fracture of the steel material measured in a DWTT test becomes 85% or more is −10° C. or less, $$\text{Ceq value} = C + Mn/6 + (Cu+Ni)/15 + (Cr+Mo+V)/5 \quad (1)$$

$$\text{Pcm value} = C + Si/30 + (Mn+Cu+Cr)/20 + Ni/60 + Mo/15 + V/10 \quad (2)$$

where, in Formulae (1) and (2), the symbol of each element represents the content (mass %) of the element and is zero when the steel material does not contain the element.

[2] The steel material for line pipes described in [1], the steel material further including, by mass, Ca: 0.0005% to 0.0035%.

[3] A method for producing a steel material for line pipes, wherein a 0.23% compressive strength of a portion of the steel material, the portion extending from a surface of the steel material to a ⅛-plate thickness position, in a rolling orthogonal direction is 340 MPa or more, and a temperature at which a percent ductile fracture of the steel material measured in a DWTT test becomes 85% or more is −10° C. or less, the method including:

heating a steel having the composition described in [1] or [2] to a temperature of 1000° C. to 1200° C.;

hot-rolling the steel such that a cumulative rolling reduction ratio in a non-recrystallization temperature range is 60% or more, and such that a finish rolling temperature is equal to or greater than an Ar₃ transformation temperature and equal to or less than (Ar₃ transformation temperature+60° C.);

subsequently performing accelerated cooling from a temperature equal to or greater than the Ar₃ transformation temperature to a temperature of 200° C. to 450° C. at a cooling rate of 10° C./s or more; and then performing reheating such that a temperature of the steel material at the ⅛-plate thickness position is 350° C. or more and such that a temperature of the surface of the steel material is 530° C. or less.

[4] A line pipe having a composition containing, by mass, C: 0.030% to 0.10%, Si: 0.01% to 0.15%, Mn: 1.0% to 2.0%, Nb: 0.005% to 0.050%, Ti: 0.005% to 0.025%, and Al: 0.08% or less, the composition further containing one or more elements selected from, by mass, Cu: 0.5% or less, Ni: 1.0% or less, Cr: 1.0% or less, Mo: 0.5% or less, and V: 0.1% or less, wherein a Ceq value represented by Formula (1) is 0.35 or more and a Pcm value represented by Formula (2) is 0.20 or less, with the balance being Fe and incidental impurities, wherein a metallic microstructure of the line pipe at a ⅛-wall thickness position relative to an inner surface of the line pipe includes bainite of an area fraction of 85% or more, polygonal ferrite of an area fraction of 10% or less, and martensite-austenite constituent of an area fraction of 5% or less, and wherein a 0.23% compressive strength of a portion of the line pipe, the portion extending from the inner surface of the line pipe to the ⅛-wall thickness position, in a circumferential direction of the line pipe at a major axis position of the line pipe is 340 MPa or more, a collapse pressure of the line pipe is 35 MPa or more, and a temperature at which a percent ductile fracture of the line pipe measured in a DWTT test becomes 85% or more is −10° C. or less, $$\text{Ceq value} = C + Mn/6 + (Cu+Ni)/15 + (Cr+Mo+V)/5 \quad (1)$$

$$\text{Pcm value} = C + Si/30 + (Mn+Cu+Cr)/20 + Ni/60 + Mo/15 + V/10 \quad (2)$$

where, in Formulae (1) and (2), the symbol of each element represents the content (mass %) of the element and is zero when the line pipe does not contain the element.

[5] The line pipe described in [4], the line pipe further including, by mass, Ca: 0.0005% to 0.0035%.

[6] The line pipe described in [4] or [5], the line pipe further including a coating layer.

[7] A method for producing a line pipe, wherein a 0.23% compressive strength of a portion of the line pipe, the portion extending from an inner surface of the line pipe to a ⅛-wall thickness position, in a circumferential direction of the line pipe at a major axis position of the line pipe is 340 MPa or more, a collapse pressure of the line pipe is 35 MPa or more, and a temperature at which a percent ductile fracture of the line pipe measured in a DWTT test becomes 85% or more is −10° C. or less, the method including cold forming the steel material for line pipes described in [1] or [2] into a pipe-like shape; joining butting edges to each other by seam welding; and subsequently performing pipe expansion at an expansion ratio of 1.2% or less to produce a pipe.

[8] A method for producing a line pipe, wherein a 0.23% compressive strength of a portion of the line pipe, the portion extending from an inner surface of the line pipe to a ⅛-wall thickness position, in a circumferential direction of the line pipe at a major axis position of the line pipe is 340 MPa or more, a collapse pressure of the line pipe is 35 MPa or more, and a temperature at which a percent ductile fracture of the line pipe measured in a DWTT test becomes 85% or more is −10° C. or less, the method including cold forming a steel material for line pipes produced by the method described in [3] into a pipe-like shape; joining butting edges to each other by seam welding; and subsequently performing pipe expansion at an expansion ratio of 1.2% or less to produce a pipe.

[9] The method for producing a line pipe described in [7] or [8], the method further including performing a coating treatment subsequent to the pipe expansion, the coating treatment including heating the pipe such that a temperature of the surface of the pipe reaches 200° C. or more.

According to aspects of the present invention, a steel material for line pipes which has excellent collapse resistant performance can be produced. Aspects of the present invention can be suitably applied to deep-ocean pipelines.

According to aspects of the present invention, a thick-walled line pipe having excellent low-temperature toughness and a high compressive strength can be provided without applying special conditions for forming steel pipes or performing a heat treatment subsequent to pipe production.

DETAILED DESCRIPTION OF EMBODIMENTS OF THE INVENTION

An embodiment of the present invention is described below. When referring to the contents of constituent elements, the symbol "%" refers to "% by mass" unless otherwise specified.

1. Chemical Composition of Steel Material for Line Pipes or Line Pipe

C: 0.030% to 0.10%

C is an element most effective in increasing the strength of a steel plate produced by accelerated cooling. However, if the C content is less than 0.030%, a sufficiently high strength may fail to be maintained. Accordingly, the C content is limited to 0.030% or more and is preferably 0.040% or more. On the other hand, if the C content is more than 0.10%, toughness becomes degraded. In addition, the formation of MA may be accelerated. This results in a reduction in compressive strength. Accordingly, the C content is limited to 0.10% or less and is preferably 0.098% or less.

Si: 0.01% to 0.15%

Si is used for deoxidization. However, if the Si content is less than 0.01%, a sufficient deoxidation effect may fail to be achieved. Accordingly, the Si content is limited to 0.01% or more and is preferably 0.03% or more. On the other hand, if the Si content is more than 0.15%, toughness becomes degraded. In addition, the formation of MA may be accelerated. This results in a reduction in compressive strength. Accordingly, the Si content is limited to 0.15% or less and is preferably 0.10% or less.

Mn: 1.0% to 2.0%

The Mn content is limited to 1.0% to 2.0%. Mn is used for increasing strength and enhancing toughness. However, if the Mn content is less than 1.0%, the above advantageous effects may fail to be produced to a sufficient degree. Accordingly, the Mn content is limited to 1.0% or more and is preferably 1.5% or more. On the other hand, if the Mn content is more than 2.0%, toughness may become degraded. Accordingly, the Mn content is limited to 2.0% or less and is preferably 1.95% or less.

Nb: 0.005% to 0.050%

Nb reduces the size of microstructures and thereby enhances toughness. Nb also causes the formation of carbides, which increase strength. However, if the Nb content is less than 0.005%, the above advantageous effects may fail to be produced to a sufficient degree. Accordingly, the Nb content is limited to 0.005% or more and is preferably 0.010% or more. On the other hand, if the Nb content is more than 0.050%, the toughness of a weld heat-affected zone (HAZ) caused by welding may become degraded. Accordingly, the Nb content is limited to 0.050% or less and is preferably 0.040% or less.

Ti: 0.005% to 0.025%

Ti reduces the likelihood of austenite grains coarsening during heating of slabs by the pinning effect of TiN and thereby enhances toughness. However, if the Ti content is less than 0.005%, the above advantageous effects may fail to be produced to a sufficient degree. Accordingly, the Ti content is limited to 0.005% or more and is preferably 0.008% or more. On the other hand, if the Ti content is more than 0.025%, toughness may become degraded. Accordingly, the Ti content is limited to 0.025% or less and is preferably 0.023% or less.

Al: 0.08% or Less

Al is used as a deoxidizing agent. In order to produce the advantageous effect, the Al content is preferably 0.01% or more. However, if the Al content is more than 0.08%, the cleanliness of steel may become degraded and toughness may become degraded. Accordingly, the Al content is limited to 0.08% or less. The Al content is preferably 0.05% or less.

In accordance with aspects of the present invention, one or more elements selected from Cu: 0.5% or less, Ni: 1.0% or less, Cr: 1.0% or less, Mo: 0.5% or less, and V: 0.1% or less are contained.

Cu: 0.5% or Less

Cu is an element effective in improving toughness and increasing strength. However, if the Cu content is more than 0.5%, the HAZ toughness of a weld zone becomes degraded. Accordingly, in the case where Cu is used, the Cu content is limited to 0.5% or less. The lower limit for the Cu content is not specified. In the case where Cu is used, the Cu content is preferably 0.01% or more.

Ni: 1.0% or Less

Ni is an element effective in improving toughness and increasing strength. However, if the Ni content is more than 1.0%, the HAZ toughness of a weld zone may become degraded. Accordingly, in the case where Ni is used, the Ni content is limited to 1.0% or less. The lower limit for the Ni content is not specified. In the case where Ni is used, the Ni content is preferably 0.01% or more.

Cr: 1.0% or Less

Cr is an element that enhances hardenability and thereby effectively increases strength. However, if the Cr content is more than 1.0%, the HAZ toughness of a weld zone becomes degraded. Accordingly, in the case where Cr is used, the Cr content is limited to 1.0% or less. The lower limit for the Cr content is not specified. In the case where Cr is used, the Cr content is preferably 0.01% or more.

Mo: 0.5% or Less

Mo is an element effective in improving toughness and increasing strength. However, if the Mo content is more than 0.5%, the HAZ toughness of a weld zone may become degraded. Accordingly, in the case where Mo is used, the Mo content is limited to 0.5% or less. The lower limit for the Mo content is not specified. In the case where Mo is used, the Mo content is preferably 0.01% or more.

V: 0.1% or Less

V is an element that forms complex carbides as well as Nb and Ti and is markedly effective in increasing strength by precipitation strengthening. However, if the V content is more than 0.1%, the HAZ toughness of a weld zone may become degraded. Accordingly, in the case where V is used, the V content is limited to 0.1% or less. The lower limit for the V content is not specified. In the case where V is used, the V content is preferably 0.01% or more.

In accordance with aspects of the present invention, the Ceq value represented by Formula (1) is 0.35 or more and the Pcm value represented by Formula (2) is 0.20 or less.

Ceq Value: 0.35 or More

The Ceq value is limited to 0.35 or more. The Ceq value is represented by Formula (1) below. The Ceq value is in correlation with the strength of base metal and is used as a measure of strength. If the Ceq value is less than 0.35, a high tensile strength of 570 MPa or more may fail to be achieved. Accordingly, the Ceq value is limited to 0.35 or more. The Ceq value is preferably 0.36 or more.

$$\text{Ceq value} = C + Mn/6 + (Cu+Ni)/15 + (Cr+Mo+V)/5 \quad (1)$$

In Formula (1), the symbol of each element represents the content (mass %) of the element and is zero when the chemical composition does not contain the element.

Pcm Value: 0.20 or Less

The Pcm value is limited to 0.20 or less. The Pcm value is represented by Formula (2) below. The Pcm value is used as a measure of weldability; the higher the Pcm value, the lower the toughness of a weld HAZ. The Pcm value needs to be strictly limited particularly in a thick-walled high-strength steel, because the impact of the Pcm value is significant in a thick-walled high-strength steel. Accordingly, the Pcm value is limited to 0.20 or less. The Pcm value is preferably 0.19 or less.

$$\text{Pcm value} = C + Si/30 + (Mn+Cu+Cr)/20 + Ni/60 + Mo/15 + V/10 \quad (2)$$

In Formula (2), the symbol of each element represents the content (mass %) of the element and is zero when the composition does not contain the element.

In accordance with aspects of the present invention, the chemical composition may contain the following element as needed.

Ca: 0.0005% to 0.0035%

Ca is an element effective in controlling the shape of sulfide inclusions and improve ductility. The advantageous effects are produced when the Ca content is 0.0005% or more. Accordingly, in the case where the chemical composition contains Ca, the Ca content is preferably 0.0005% or more. When the Ca content exceeds 0.0035%, the advantageous effects peak out; on the contrary, cleanliness may become degraded and, consequently, toughness may become degraded. Thus, in the case where the chemical composition contains Ca, the Ca content is preferably 0.0035% or less.

The remaining part of the chemical composition which is other than the above-described elements, that is, the balance, includes Fe and incidental impurities. The chemical composition may contain an element other than the above-described elements such that the action and advantageous effects according to aspects of the present invention are not impaired.

2. Metallic Microstructure of Steel Material for Line Pipes or Line Pipe

In accordance with aspects of the present invention, the metallic microstructure of the steel material at a ⅛-plate thickness position that is a position ⅛ of the thickness of the steel material below the surface or the metallic microstructure of the line pipe at a ⅛-wall thickness position that is a position ⅛ of the wall thickness of the pipe below the inner surface of the line pipe is specified. In accordance with aspects of the present invention, controlling the metallic microstructure of the steel material at the position ⅛ of the thickness of the steel material below the surface increases the compressive strength of the steel material. As a result, a steel material for line pipes or line pipe having excellent collapse resistant performance can be produced.

Area Fraction of Bainite is 85% or More

The metallic microstructure according to aspects of the present invention is composed primarily of bainite in order to limit the reduction in compressive strength due to the Bauschinger effect. The expression "the metallic microstructure according to aspects of the present invention is composed primarily of bainite" means that the area fraction of bainite in the entire metallic microstructure is 85% or more. For limiting the reduction in compressive strength due to the Bauschinger effect, the metallic microstructure is desirably composed only of bainite in order to prevent the accumulation of dislocations at the interfaces between different phases and in the hard second phase. However, when the fraction of the balance of microstructures other than bainite is 15% or less, they may be acceptable.

Area Fractions of Polygonal Ferrite and Martensite-Austenite Constituent Are 10% or Less and 5% or Less, Respectively For reducing the Bauschinger effect and achieving a high compressive strength, it is desirable to form a uniform microstructure free of soft polygonal ferrite phase or hard martensite-austenite constituent in order to reduce the likelihood of dislocations locally accumulating in the microstructure during deformation. Accordingly, in addition to forming a microstructure composed primarily of bainite as described above, the area fractions of polygonal ferrite and the martensite-austenite constituent are limited to 10% or less and 5% or less, respectively. The area fraction of the martensite-austenite constituent may be 0%. The area fraction of polygonal ferrite may be 0%.

The metallic microstructure according to aspects of the present invention may include any phases other than bainite, polygonal ferrite, or the martensite-austenite constituent as long as it includes the above-described structure. Examples of the other phases include pearlite, cementite, and martensite. The amount of the other phases is preferably minimized; the area fraction of the other phases at a position ⅛ of the plate thickness below the surface of the steel material is preferably 5% or less.

In accordance with aspects of the present invention, the metallic microstructure of a portion of the steel material that extends from the position ⅛ of the plate thickness below the surface of the steel material toward the center of the steel material in the plate-thickness direction or a portion of the line pipe that extends from the position ⅛ of the wall thickness below the inner surface of the pipe toward the center of the pipe in the wall-thickness direction is not limited. However, the fraction of bainite in the above metallic microstructure is preferably 70% or more and is more preferably 75% or more in consideration of the balance between properties such as strength and toughness. Examples of the balance of microstructure include ferrite, pearlite, martensite, and martensite-austenite constituent (MA). When the fraction of the above balance of microstructures is 30% or less and is more preferably 25% or less in total, they may be acceptable.

In accordance with aspects of the present invention, when the metallic microstructure of the steel material at the position ⅛ of the thickness of the steel material below the surface satisfies the above conditions, the compressive strength of a portion of the steel material which extends from the surface to the ⅛-plate thickness position and the compressive strength of a portion of the line pipe which extends from the inner surface to the ⅛-wall thickness position can be increased and, consequently, excellent collapse resistant performance can be achieved.

3. Method for Producing Steel Material for Line Pipes

The method for producing a steel material for line pipes according to aspects of the present invention includes heating a steel slab having the above-described chemical composition, hot rolling the steel slab, subsequently performing accelerated cooling, and then performing tempering (reheating). The reasons for limiting the production conditions are described below. Hereinafter, the term "temperature" refers to the average temperature of the steel material (steel plate) in the thickness direction, unless otherwise specified. The average temperature of the steel plate in the thickness direction is determined on the basis of thickness, surface temperature, cooling conditions, etc. by simulation calculation or the like. For example, the average temperature of the steel plate in the thickness direction may be calculated from a temperature distribution in the thickness direction determined by a finite difference method.

Steel Slab Heating Temperature: 1000° C. to 1200° C.

If the steel slab heating (reheating) temperature is less than 1000° C., NbC does not dissolve sufficiently and, consequently, precipitation strengthening may fail to be achieved in the subsequent step. In addition, the coarse undissolved carbides degrade HIC resistance. On the other hand, if the steel slab heating temperature is more than 1200° C., the DWTT property becomes degraded. Accordingly, the steel slab heating temperature is limited to 1000° C. to 1200° C. The steel slab heating temperature is preferably 1000° C. or more and 1150° C. or less.

Cumulative Rolling Reduction Ratio in Non-Recrystallization Temperature Range: 60% or More In the step of hot-rolling the heated steel slab, after rolling has been performed in a recrystallization temperature range, rolling is performed in a non-recrystallization temperature range. The conditions under which rolling is performed in the recrystallization temperature range are not limited. For achieving high base metal toughness, it is necessary to perform sufficient rolling reduction within the non-recrystallization temperature range in the hot rolling process. However, if the cumulative rolling reduction ratio in the non-recrystallization temperature range is less than 60%, the size of crystal grains may fail to be reduced to a sufficient degree. Consequently, a sufficient DWTT property may fail to be achieved. Accordingly, the cumulative rolling reduction ratio in the non-recrystallization temperature range is limited to 60% or more. The cumulative rolling reduction ratio in the non-recrystallization temperature range is preferably 63% or more.

Finish Rolling Temperature: $Ar_3$ Transformation temperature or More and ($Ar_3$ Transformation temperature+60° C.) or Less For limiting the reduction in strength due to the Bauschinger effect, it is necessary to form a metallic microstructure composed primarily of bainite and suppress the formation of soft microstructures, such as polygonal ferrite. This requires the hot rolling to be performed within the temperature range of the $Ar_3$ transformation temperature or more, in which polygonal ferrite does not form. Accordingly, the finish rolling temperature is limited to be equal to or greater than the $Ar_3$ transformation temperature and is preferably equal to or greater than ($Ar_3$ transformation temperature+10° C.). For achieving high base metal toughness, it is necessary to perform the rolling at lower temperatures in the temperature range of the $Ar_3$ transformation temperature or more. Accordingly, the upper limit for the finish rolling temperature is set to ($Ar_3$ transformation temperature+60° C.) The finish rolling temperature is preferably equal to or less than ($Ar_3$ transformation temperature+50° C.)

The $Ar_3$ transformation temperature can be calculated using Formula (3) below.

$$Ar_3(° C.)=910-310C-80Mn-20Cu-15Cr-55Ni-80Mo \quad (3)$$

Cooling Start Temperature: $Ar_3$ Transformation Temperature or More

If the cooling start temperature is less than the $Ar_3$ transformation temperature, the area fraction of polygonal ferrite may exceed 10% and a sufficiently high compressive strength may fail to be achieved due to a reduction in strength caused by the Bauschinger effect. Accordingly, the cooling start temperature is limited to be equal to or greater than the $Ar_3$ transformation temperature. The cooling start temperature is preferably equal to or greater than ($Ar_3$ transformation temperature+10° C.)

Cooling Rate: 10° C./s or More

Accelerated cooling performed at a cooling rate of 10° C./s or more is a process essential for producing a high strength steel plate having high toughness. Performing cooling at a high cooling rate enables strength to be increased due to transformation strengthening. However, if the cooling rate is less than 10° C./s, a sufficiently high strength may fail to be achieved. Furthermore, diffusion of C may occur. This results in thickening of C at non-transformed austenite and an increase in the amount of MA formed. Consequently, compressive strength may be reduced, because the presence of hard second phases, such as MA, accelerates the Bauschinger effect as described above. When the cooling rate is 10° C./s or more, diffusion of C which occurs during the cooling is suppressed and, consequently, the formation of MA is reduced. Accordingly, the cooling rate in the accelerated cooling is limited to 10° C./s or more. The cooling rate is preferably 20° C./s or more. If the cooling rate is excessively high, hard microstructures, such as martensite, may be formed and, consequently, toughness may become degraded. In addition, compressive strength may be reduced due to the acceleration of the Bauschinger effect. Accordingly, the cooling rate is preferably 200° C./s or less.

Cooling Stop Temperature: 200° C. to 450° C.

Performing rapid cooling to a temperature of 200° C. to 450° C. by the accelerated cooling subsequent to the rolling enables the formation of bainite phase and a uniform microstructure. However, if the cooling stop temperature is less than 200° C., an excessive amount of martensite-austenite constituent (MA) may be formed. This results in a reduction in compressive strength due to the Bauschinger effect and degradation of toughness. On the other hand, if the cooling stop temperature is more than 450° C., pearlite may be formed. This makes it not possible to achieve a sufficiently high strength and results in a reduction in compressive strength due to the Bauschinger effect. Accordingly, the cooling stop temperature is limited to 200° C. to 450° C. The cooling stop temperature is preferably 250° C. or more and is preferably 430° C. or less.

Reheating Temperature: 350° C. or More at ⅛-Plate Thickness Position and 530° C. or Less at Surface of Steel Material Reheating is performed subsequent to the accelerated cooling. In the accelerated cooling of the steel plate, the cooling rate in the surface-layer portion of the steel plate is high, and the surface-layer portion of the steel plate is cooled to a lower temperature than the inside of the steel plate. Consequently, the martensite-austenite constituent (MA) is likely to be formed in the surface-layer portion of the steel plate. Since hard phases, such as MA, accelerate the Bauschinger effect, heating the surface-layer portion of the steel plate subsequent to the accelerated cooling to decompose MA enables to suppress the reduction in compressive strength due to the Bauschinger effect. If the reheating temperature is less than 350° C. at the ⅛-plate thickness position, MA fails to be decomposed to a sufficient degree.

If the reheating temperature is more than 530° C. at the surface of the steel material, strength may be reduced. This makes it difficult to achieve the predetermined strength. Since collapse resistant performance is in correlation with the compressive strength of a portion of the steel material which extends from the surface of the steel material to the ⅛-plate thickness position, controlling the reheating temperature of the portion of the steel material which extends from the surface of the steel material to the ⅛-plate thickness position enables the certain strength to be maintained while decomposing MA. Accordingly, the reheating temperature is limited to 350° C. or more at the ⅛-plate thickness position and 530° C. or less at the surface of the steel material. The reheating temperature is preferably 370° C. or more at the ⅛-plate thickness position and 520° C. or less at the surface of the steel material.

Examples of means for performing reheating subsequent to the accelerated cooling include, but are not limited to, atmosphere furnace heating, gas combustion, and induction heating. Induction heating is preferable in consideration of economy, controllability, etc.

4. Method for Producing Line Pipe

A steel pipe (line pipe) can be produced using the steel plate (steel material) according to aspects of the present invention or a steel plate (steel material) produced by the above-described method. Examples of a method for forming the steel material into shape include a method in which a steel material is formed into the shape of a steel pipe by cold forming, such as a UOE process or press bending (also referred to as "bending press"). In the UOE process, the edges of a steel plate (steel material) in the width direction are subjected to groove cutting edge preparation and then crimped using a press machine. Subsequently, the steel plate is formed into a cylindrical shape such that the edges of the steel plate in the width direction face each other using a U-ing press machine and an O-ing press machine. Then, the edges of the steel plate in the width direction are brought into abutment with and welded to each other. This welding is referred to as "seam welding". The seam welding is preferably performed using a method including two steps, that is, a tack welding step of holding the cylindrical steel plate, bringing the edges of the steel plate in the width direction into abutment with each other, and performing tack welding; and a final welding step of subjecting the inner and outer surfaces of the seam of the steel plate to welding using a submerged arc welding method. After the seam welding, pipe expansion is performed in order to remove welding residual stress and to enhance the roundness of the steel pipe. In the pipe expansion step, the expansion ratio (the ratio of a change in the outer diameter of the pipe which occurs during the pipe expansion to the outer diameter of the pipe before the pipe expansion) is set to 1.2% or less. This is because, if the expansion ratio is excessively high, compressive strength will be significantly reduced due to the Bauschinger effect. The expansion ratio is preferably 1.0% or less. The expansion ratio is preferably 0.4% or more and is more preferably 0.6% or more in order to reduce welding residual stress and enhance the roundness of the steel pipe.

Subsequent to the pipe expansion, a coating treatment may be performed in order to prevent corrosion. In the coating treatment, for example, the steel pipe that has been subjected to the pipe expansion is heated to 200° C. or more and, subsequently, a resin known in the related art or the like is applied to the outer or inner surface of the steel pipe.

In the press bending, the steel plate is repeatedly subjected to three-point bending to gradually change its shape and, thereby, a steel pipe having a substantially circular cross section is produced. Then, seam welding is performed as in the UOE process described above. Also in the press bending, pipe expansion may be performed after the seam welding.

5. Steel Material for Line Pipes

A steel material for line pipes according to aspects of the present invention has the above-described composition and the above-described metallic microstructure. The 0.23% compressive strength of a portion of the steel material, the portion extending from the surface of the steel material to the ⅛-plate thickness position, in the transverse direction (rolling orthogonal direction) is 340 MPa or more. The temperature at which a percent ductile fracture of the steel material measured by a DWTT test becomes 85% or more is −10° C. or less. Since the 0.23% compressive strength of the portion of the steel material for line pipes according to aspects of the present invention which extends from the surface to the ⅛-plate thickness position in the transverse direction is 340 MPa or more, the steel material for line pipes has excellent collapse resistant performance. Note that 0.23% compressive strength can be determined by the method described in Examples below.

6. Line Pipe

A line pipe according to aspects of the present invention has the above-described composition and the above-described metal microstructure. In addition, the 0.23% compressive strength of a portion of the line pipe, the portion extending from the inner surface of the pipe to the ⅛-wall thickness position, in the circumferential direction at the major axis position of the pipe is 340 MPa or more. The collapse pressure of the line pipe is 35 MPa or more. The temperature at which a percent ductile fracture of the line pipe measured by a DWTT test becomes 85% or more is −10° C. or less. Since the 0.23% compressive strength of the portion of the line pipe according to aspects of the present invention which extends from the inner surface to the ⅛-wall thickness position in the circumferential direction at the major axis position is 340 MPa or more and the collapse pressure of the line pipe is 35 MPa or more, the line pipe has excellent collapse resistant performance. The 0.23% compressive strength of a portion of the line pipe according to aspects of the present invention which has the above-described composition and the above-described microstructure and includes the coating layer formed by the coating treatment, the portion extending from the inner surface of the pipe to the ⅛-wall thickness position, in the circumferential direction at the major axis position is 390 MPa or more. The collapse pressure of the line pipe is 40 MPa or more. Thus, the line pipe has excellent collapse resistant performance. Note that the term "major axis position of pipe" used herein refers to, when considering a position in the circumferential direction of the pipe, a position 90 degrees from the position at which the radius of the pipe is the minimum. Note that 0.23% compressive strength can be determined by the method described in Examples below.

EXAMPLES

Slabs were manufactured from steels (Steel types A to J) having the chemical compositions described in Table 1 by a continuous casting process. The slabs were heated, hot-rolled, and then immediately processed in a water-cooling-type cooling equipment to perform accelerated cooling. Subsequently, reheating was performed using an induction heating furnace or a gas combustion furnace. Hereby, steel plates (Nos. 1 to 23) having a thickness of 40 mm were prepared. Note that the heating temperature, the finish rolling temperature, the cooling start temperature, and the cooling stop temperature were determined as the average temperatures over the steel plate, while the reheating temperature was measured at the surface and the ⅛-plate thickness position. The average temperatures and the temperature at the ⅛-plate thickness position were calculated on the basis of the surface temperature of the slab or steel plate using parameters such as plate thickness, thermal conductivity, etc.

Pipes having a wall thickness of 39 mm and an outside diameter of 813 mm were prepared using the above steel plates by an UOE process. Seam welding was performed by four-wire submerged arc welding such that one welding path was formed each on the inner and outer surfaces of the pipe. The heat input during the welding was selected from the range of 100 kJ/cm in accordance with the thickness of the steel plate. After welding, the pipes were expanded at an expansion ratio of 0.6% to 1.5%. The expanded pipes were further subjected to a coating treatment at 230° C. Table 2 summarizes the conditions under which the steel plates were produced and the condition under which the steel pipes were produced (expansion ratio).

TABLE 1

| Steel type | Composition (mass %) | | | | | | | | | | | | Ceq value | Pcm value | Ar₃ transformation temperature (° C.) | Remark |
|---|---|---|---|---|---|---|---|---|---|---|---|---|---|---|---|---|
| | C | Si | Mn | Nb | Ti | Al | Ca | Cu | Ni | Cr | Mo | V | | | | |
| A | 0.055 | 0.050 | 1.82 | 0.021 | 0.013 | 0.033 | | | | 0.280 | 0.040 | | 0.422 | 0.164 | 740 | Invention example |
| B | 0.042 | 0.100 | 1.75 | 0.023 | 0.020 | 0.028 | | 0.210 | 0.190 | | | | 0.360 | 0.147 | 742 | |
| C | 0.093 | 0.080 | 1.58 | 0.023 | 0.011 | 0.031 | | 0.100 | 0.080 | | 0.070 | | 0.382 | 0.186 | 743 | |
| D | 0.055 | 0.090 | 1.86 | 0.027 | 0.015 | 0.030 | | 0.140 | 0.150 | | 0.210 | | 0.426 | 0.175 | 716 | |
| E | 0.053 | 0.050 | 1.93 | 0.025 | 0.011 | 0.030 | | | | | 0.180 | 0.020 | 0.415 | 0.165 | 725 | |
| F | 0.056 | 0.070 | 1.85 | 0.024 | 0.014 | 0.027 | 0.0023 | 0.100 | 0.200 | 0.240 | | | 0.432 | 0.171 | 728 | |
| G | <u>0.026</u> | 0.080 | 1.65 | 0.029 | 0.014 | 0.028 | | 0.130 | 0.140 | | 0.050 | 0.005 | <u>0.330</u> | 0.124 | 756 | Comparative example |
| H | 0.078 | 0.070 | 1.80 | 0.022 | 0.011 | 0.032 | | 0.100 | 0.100 | 0.310 | 0.180 | | 0.489 | <u>0.205</u> | 715 | |
| I | <u>0.110</u> | 0.060 | 1.62 | 0.026 | 0.020 | 0.033 | | | | | 0.050 | | 0.390 | 0.196 | 742 | |
| J | 0.056 | <u>0.180</u> | 1.83 | 0.024 | 0.015 | 0.028 | | | | 0.310 | 0.060 | 0.010 | 0.437 | 0.174 | 737 | |

*The underlined values are outside the scope of the present invention.

Ceq value = C + Mn/6 + (Cu + Ni)/15 + (Cr + Mo + V)/5

Pcm value = C + Si/30 + (Mn + Cu + Cr)/20 + Ni/60 + Mo/15 + V/10

Ar₃ transformation temperature = 910 − 310C − 80Mn − 20Cu − 15Cr − 55Ni − 80Mo (The symbols of elements represent the content (mass %) of the elements.)

TABLE 2

| No. | Steel type | Thickness (mm) | Heating temperature (° C.) | Cumulative rolling reduction ratio in non-recrystallization temperature range (%) | Finish rolling temperature (° C.) | Cooling start temperature (° C.) | Cooling rate (° C./s) |
|---|---|---|---|---|---|---|---|
| 1 | A | 40 | 1030 | 75 | 770 | 765 | 24 |
| 2 | A | 40 | 1080 | 80 | 785 | 780 | 22 |
| 3 | A | 40 | 1040 | 75 | 770 | 770 | 23 |
| 4 | A | 40 | 1050 | 75 | 765 | 760 | 25 |
| 5 | B | 40 | 1050 | 75 | 780 | 770 | 35 |
| 6 | C | 40 | 1040 | 75 | 765 | 760 | 31 |
| 7 | D | 40 | 1070 | 75 | 765 | 760 | 28 |
| 8 | E | 40 | 1100 | 75 | 760 | 760 | 26 |
| 9 | F | 40 | 1060 | 75 | 770 | 765 | 27 |
| 10 | A | 40 | <u>950</u> | 75 | 770 | 765 | 22 |
| 11 | A | 40 | <u>1260</u> | 75 | 760 | 760 | 24 |
| 12 | A | 40 | 1040 | <u>55</u> | 765 | 760 | 22 |
| 13 | A | 40 | 1030 | 75 | 745 | <u>715</u> | 19 |
| 14 | A | 40 | 1030 | 75 | <u>805</u> | <u>800</u> | 26 |
| 15 | D | 40 | 1060 | 75 | <u>770</u> | 770 | 20 |
| 16 | D | 40 | 1070 | 75 | 765 | 760 | 25 |
| 17 | D | 40 | 1070 | 75 | 765 | 760 | 27 |
| 18 | A | 40 | 1040 | 75 | 765 | 760 | 22 |
| 19 | D | 40 | 1060 | 75 | 760 | 755 | 24 |
| 20 | G | 40 | 1050 | 75 | 775 | 770 | 26 |
| 21 | <u>H</u> | 40 | 1060 | 75 | 760 | 760 | 23 |
| 22 | <u>I</u> | 40 | 1030 | 75 | 760 | 755 | 21 |
| 23 | <u>J</u> | 40 | 1040 | 75 | 765 | 760 | 27 |

TABLE 2-continued

| No. | Cooling stop temperature (° C.) | Reheating equipment | Reheating temperature (° C.) Surface | Reheating temperature (° C.) 1/8 Position | Expansion ratio (%) | Remark |
|---|---|---|---|---|---|---|
| 1 | 320 | Induction heating furnace | 450 | 405 | 0.8 | Invention example |
| 2 | 360 | Induction heating furnace | 475 | 430 | 0.8 | |
| 3 | 310 | Induction heating furnace | 410 | 390 | 0.8 | |
| 4 | 260 | Induction heating furnace | 515 | 430 | 0.8 | |
| 5 | 330 | Gas combustion furnace | 455 | 435 | 0.8 | |
| 6 | 280 | Induction heating furnace | 460 | 395 | 0.8 | |
| 7 | 310 | Induction heating furnace | 450 | 400 | 1.0 | |
| 8 | 390 | Induction heating furnace | 460 | 433 | 0.6 | |
| 9 | 320 | Induction heating furnace | 455 | 405 | 1.0 | |
| 10 | 310 | Induction heating furnace | 460 | 405 | 0.8 | Comparative example |
| 11 | 330 | Induction heating furnace | 460 | 410 | 0.8 | |
| 12 | 320 | Induction heating furnace | 460 | 410 | 0.8 | |
| 13 | 290 | Induction heating furnace | 460 | 405 | 0.8 | |
| 14 | 330 | Induction heating furnace | 450 | 435 | 0.8 | |
| 15 | <u>500</u> | Induction heating furnace | 510 | 500 | 0.8 | |
| 16 | <u>330</u> | Induction heating furnace | 380 | <u>335</u> | 0.8 | |
| 17 | 270 | Induction heating furnace | <u>570</u> | <u>500</u> | 0.8 | |
| 18 | 340 | None | | | 0.8 | |
| 19 | 320 | Induction heating furnace | 460 | 410 | <u>1.5</u> | |
| 20 | 320 | Induction heating furnace | 460 | 410 | <u>0.8</u> | |
| 21 | 330 | Induction heating furnace | 470 | 415 | 0.8 | |
| 22 | 300 | Induction heating furnace | 480 | 410 | 0.8 | |
| 23 | 310 | Induction heating furnace | 470 | 405 | 0.8 | |

*The underlined values are outside the scope of the present invention.

The compressive property of each of the steel plates produced in the above-described manner was determined using a test piece for compressive test that was taken from a portion of the steel plate extending from the surface of the steel plate to the 1/8-plate thickness position. Specifically, a small piece of the steel plate for test piece for compressive test was taken from the steel plate such that the longitudinal direction of the small piece was equal to the transverse direction of the steel plate. The other surface of the small piece of the steel plate was cut or ground to reduce the thickness of the small piece to 1/8 of the plate thickness. Subsequently, a rectangular test piece including a parallel part having a thickness of 2.5 mm, a width of 2.5 mm, and a length of 4.0 mm was taken from the small piece of the steel plate. In order to simulate pipe production, a compressive strain of 2.5% was applied to the test piece and a tensile strain of 1.0% was then applied to the test piece. The test piece that had been subjected to the simulated pipe production was subjected to a compressive test in which a load was applied to the test piece in a compression direction. The stress at which the compressive strain was 0.23% in the resulting compressive stress-strain curve was determined as a 0.23% compressive strength.

The tensile property of each of the pipes produced in the above-described manner was evaluated on the basis of the tensile strength determined by a tensile test of a test piece that was a circumferential direction full-thickness test piece in accordance with API 5L. The compressive property of each of the pipes was determined using a test piece taken from the inner surface of the pipe at the major axis position of the pipe in the circumferential direction. Specifically, a piece of the pipe for test piece for compressive test was taken from the pipe such that the longitudinal direction of the piece was equal to the circumferential direction of the pipe. The piece of the steel plate was cut or ground from the outer surface-side of the pipe to reduce the thickness of the piece to 1/8 of the plate thickness. Subsequently, a rectangular test piece including a parallel part having a thickness of 2.5 mm, a width of 2.5 mm, and a length of 4.0 mm was taken from the piece of the steel plate. The test piece was subjected to a compressive test in which a load was applied to the test piece in a compression direction. The stress at which the compressive strain was 0.23% in the resulting compressive stress-strain curve was determined as a 0.23% compressive strength. In the measurement of collapse resistant performance, each of the pipes was cut to 7 m and a water pressure was gradually applied to the pipe inside a pressure vessel. The pressure at which the water pressure started decreasing was determined as a collapse pressure. Note that, the compression performance and collapse resistant performance were determined both after pipe expansion (as formed) and after the coating treatment at 230° C. (after heated at 230° C.)

A DWTT test piece was taken from each of the steel pipes in the circumferential direction of the pipe. Using the DWTT test piece, the temperature at which the percent ductile fracture became 85% was determined as 85% SATT.

For determining the HAZ toughness of the joint, the temperature at which the percent ductile fracture was 50% was determined as vTrs. The position of the notch was determined such that the fusion line was located at the center of the notch root of the Charpy test piece and the ratio between the weld metal and the base metal (including weld heat-affected zone) at the notch root was 1:1.

For determining metallic microstructure, a sample was taken from the inner surface-side portion of each of the steel pipes at the 1/8-plate thickness position. A cross section of the sample which was parallel to the longitudinal direction of the pipe was etched using nital after polishing, and the metallic microstructure was observed using an optical microscope. The area fractions of bainite and polygonal ferrite were calculated by image analysis of 3 photographs captured at a 200-fold magnification. For observing MA, the sample used for measuring the area fractions of bainite and polygonal ferrite was subjected to nital etching and then electrolytic etching (two-step etching). Subsequently, the metallic microstructure was observed with a scanning electron microscope (SEM). The area fraction of MA was calculated by image analysis of 3 photographs captured at a 1000-fold magnification.

Although the metallic microstructures of the pipes are determined in Examples, the results may be considered as the metallic microstructures of the respective steel plates.

Table 3 shows the metallic microstructures and mechanical properties measured.

TABLE 3

| | | Metallic microstructure | | | | Mechanical properties | |
|---|---|---|---|---|---|---|---|
| | | | | | | Steel plate | Pipe |
| No. | Steel type | Area fraction of bainite (%) | Area fraction of polygonal ferrite (%) | Area fraction of martensite-austenite constituent (%) | Balance | 0.23% Compressive strength (MPa) | 0.23% Compressive strength (MPa) As formed |
| 1 | A | 95.8 | 3.0 | 0.8 | θ | 361 | 371 |
| 2 | A | 98.5 | 0.0 | 1.2 | θ | 378 | 382 |
| 3 | A | 95.4 | 0.0 | 4.2 | θ | 347 | 355 |
| 4 | A | 94.8 | 3.5 | 0.3 | θ | 352 | 368 |
| 5 | B | 96.5 | 2.2 | 0.6 | θ | 361 | 368 |
| 6 | C | 89.0 | 7.0 | 3.4 | θ | 363 | 375 |
| 7 | D | 98.3 | 0.0 | 1.3 | θ | 381 | 379 |
| 8 | E | 98.3 | 0.0 | 0.6 | θ | 369 | 382 |
| 9 | F | 98.5 | 0.0 | 1.5 | — | 382 | 383 |
| 10 | A | 94.4 | 4.5 | 0.7 | θ | 320 | 326 |
| 11 | A | 95.0 | 3.6 | 1.3 | θ | 419 | 432 |
| 12 | A | 93.9 | 4.2 | 1.2 | θ | 351 | 356 |
| 13 | A | 67.3 | 26.0 | 6.2 | θ | 283 | 288 |
| 14 | A | 98.2 | 0.0 | 1.1 | θ | 369 | 378 |
| 15 | D | 94.9 | 0.0 | 0.4 | θ, P | 301 | 309 |
| 16 | D | 93.2 | 0.0 | 6.8 | — | 304 | 311 |
| 17 | D | 98.0 | 0.0 | 0.3 | θ | 322 | 331 |
| 18 | A | 87.8 | 5.1 | 7.1 | — | 317 | 320 |
| 19 | D | 98.1 | 0.0 | 1.1 | θ | 353 | 328 |
| 20 | G | 91.2 | 8.0 | 0.1 | θ | 300 | 302 |
| 21 | H | 98.4 | 0.0 | 1.2 | θ | 401 | 412 |
| 22 | I | 83.9 | 7.5 | 7.2 | θ, P | 295 | 296 |
| 23 | J | 89.4 | 4.8 | 5.8 | — | 316 | 328 |

| | Mechanical properties Pipe | | | | | |
|---|---|---|---|---|---|---|
| No. | 0.23% Compressive strength (MPa) After heated at 230° C. | Collapse pressure (MPa) As formed | Collapse pressure (MPa) After heated at 230° C. | Tensile strength (MPa) | DWTT property 85% SATT (° C.) | HAZ toughness vTrs (° C.) | Remark |
| 1 | 457 | 37.1 | 46.8 | 615 | −27 | −42 | Invention example |
| 2 | 467 | 38.5 | 47.2 | 649 | −20 | −38 | |
| 3 | 453 | 36.7 | 46.1 | 635 | −27 | −40 | |
| 4 | 446 | 36.3 | 46.1 | 597 | −22 | −38 | |
| 5 | 453 | 36.9 | 46.4 | 578 | −26 | −47 | |
| 6 | 518 | 38.5 | 52.1 | 585 | −33 | −28 | |
| 7 | 463 | 38.2 | 47.2 | 645 | −25 | −33 | |
| 8 | 462 | 39.0 | 46.8 | 643 | −37 | −44 | |
| 9 | 465 | 38.4 | 47.3 | 648 | −28 | −35 | |
| 10 | 424 | 33.3 | 43.2 | 559 | −40 | −41 | Comparative example |
| 11 | 550 | 44.0 | 51.9 | 741 | −5 | −40 | |
| 12 | 463 | 36.5 | 47.2 | 614 | −5 | −38 | |
| 13 | 555 | 29.1 | 51.1 | 573 | −47 | −42 | |
| 14 | 461 | 37.6 | 47.1 | 641 | −5 | −41 | |
| 15 | 373 | 31.2 | 38.2 | 552 | −28 | −35 | |
| 16 | 417 | 31.0 | 42.8 | 663 | −30 | −35 | |
| 17 | 399 | 33.9 | 40.9 | 560 | −28 | −33 | |
| 18 | 463 | 32.8 | 47.1 | 693 | −27 | −43 | |
| 19 | 401 | 33.6 | 41.0 | 626 | −30 | −32 | |
| 20 | 415 | 31.4 | 42.5 | 521 | −27 | −52 | |
| 21 | 503 | 43.2 | 48.9 | 699 | −17 | −5 | |

TABLE 3-continued

| 22 | 451 | <u>30.5</u> | 46.2 | <u>560</u> | −25 | −10 |
| 23 | 463 | <u>33.6</u> | 46.9 | <u>627</u> | −23 | −36 |

*The underlined values are outside the scope of the present invention.
* θ: Cementite, P: Pearlite In Table 3, all of Nos. 1 to 9 had a tensile strength of 570 MPa or more; 0.23% compressive strengths of 340 MPa or more as steel plate, 340 MPa or more as formed, and 390 MPa or more after heated at 230° C.; collapse pressures of 35 MPa or more as formed and 40 MPa or more after heated at 230° C.; as for a DWTT property, a 85% SATT of −10° C. or less; and a HAZ toughness of −20° C. or less. That is, all of Nos. 1 to 9 were evaluated as good.

In contrast, in Nos. 10 to 19, although the composition fell within the scope according to aspects of the present invention, the production method was outside the scope of the present invention and therefore the intended microstructure was not formed. As a result, Nos. 10 to 19 were evaluated as poor in terms of any of tensile strength, 0.23% compressive strength, and DWTT property. In Nos. 20 to 23, the chemical composition was outside the scope of the present invention. As a result, Nos. 20 to 23 were evaluated as poor in terms of any of tensile strength, compressive strength, DWTT property, and HAZ toughness.

According to aspects of the present invention, a steel pipe of API X70 grade or more which has a high strength and excellent low-temperature toughness may be produced. This steel pipe may be used as deep-ocean line pipes that require high collapse resistant performance.

The invention claimed is:

1. A steel material for line pipes, the steel material comprising a composition containing, by mass,
C: 0.030% to 0.10%,
Si: 0.01% to 0.15%,
Mn: 1.0% to 2.0%,
Nb: 0.005% to 0.050%,
Ti: 0.005% to 0.025%, and
Al: 0.08% or less,
the composition further containing one or more elements selected from, by mass,
Cu: 0.5% or less,
Ni: 1.0% or less,
Cr: 1.0% or less,
Mo: 0.5% or less, and
V: 0.1% or less, wherein a Ceq value represented by Formula (1) is 0.35 or more and a Pcm value represented by Formula (2) is 0.20 or less, with the balance being Fe and incidental impurities,
wherein a metallic microstructure of the steel material at a ⅛-plate thickness position relative to a surface of the steel material includes bainite of an area fraction of 85% or more, polygonal ferrite of an area fraction of 10% or less, and martensite-austenite constituent of an area fraction of 5% or less, and
wherein a 0.23% compressive strength of a portion of the steel material, the portion extending from the surface of the steel material to the ⅛-plate thickness position, in a rolling orthogonal direction is 340 MPa or more, and a temperature at which a percent ductile fracture of the steel material measured in a DWTT test becomes 85% or more is −10° C. or less, $$\text{Ceq value} = C + Mn/6 + (Cu+Ni)/15 + (Cr+Mo+V)/5 \quad (1)$$

$$\text{Pcm value} = C + Si/30 + (Mn+Cu+Cr)/20 + Ni/60 + Mo/15 + V/10 \quad (2)$$

where, in Formulae (1) and (2), the symbol of each element represents the content (mass %) of the element and is zero when the steel material does not contain the element.

2. The steel material for line pipes according to claim 1, the steel material further comprising, by mass, Ca: 0.0005% to 0.0035%.

3. A method for producing a steel material for line pipes according to claim 1, wherein a 0.23% compressive strength of a portion of the steel material, the portion extending from a surface of the steel material to a ⅛-plate thickness position, in a rolling orthogonal direction is 340 MPa or more, and a temperature at which a percent ductile fracture of the steel material measured in a DWTT test becomes 85% or more is −10° C. or less, the method comprising:
heating a steel having the composition according to claim 1 to a temperature of 1000° C. to 1200° C.;
hot-rolling the steel such that a cumulative rolling reduction ratio in a non-recrystallization temperature range is 60% or more, and such that a finish rolling temperature is equal to or greater than an $Ar_3$ transformation temperature and equal to or less than ($Ar_3$ transformation temperature+60° C.);
subsequently performing accelerated cooling from a temperature equal to or greater than the $Ar_3$ transformation temperature to a temperature of 200° C. to 450° C. at a cooling rate of 10° C./s or more; and
then performing reheating such that a temperature of the steel material at the ⅛-plate thickness position is 350° C. or more and such that a temperature of the surface of the steel material is 530° C. or less.

4. A method for producing a steel material for line pipes according to claim 2, wherein a 0.23% compressive strength of a portion of the steel material, the portion extending from a surface of the steel material to a ⅛-plate thickness position, in a rolling orthogonal direction is 340 MPa or more, and a temperature at which a percent ductile fracture of the steel material measured in a DWTT test becomes 85% or more is −10° C. or less, the method comprising:
heating a steel having the composition according to claim 2 to a temperature of 1000° C. to 1200° C.;
hot-rolling the steel such that a cumulative rolling reduction ratio in a non-recrystallization temperature range is 60% or more, and such that a finish rolling temperature is equal to or greater than an $Ar_3$ transformation temperature and equal to or less than ($Ar_3$ transformation temperature+60° C.);
subsequently performing accelerated cooling from a temperature equal to or greater than the $Ar_3$ transformation temperature to a temperature of 200° C. to 450° C. at a cooling rate of 10° C./s or more; and
then performing reheating such that a temperature of the steel material at the ⅛-plate thickness position is 350° C. or more and such that a temperature of the surface of the steel material is 530° C. or less.

5. A line pipe comprising a composition containing, by mass,
C: 0.030% to 0.10%,
Si: 0.01% to 0.15%, Mn: 1.0% to 2.0%,
Nb: 0.005% to 0.050%,
Ti: 0.005% to 0.025%, and
Al: 0.08% or less,
the composition further containing one or more elements selected from, by mass,
Cu: 0.5% or less,
Ni: 1.0% or less,
Cr: 1.0% or less,
Mo: 0.5% or less, and
V: 0.1% or less, wherein a Ceq value represented by Formula (1) is 0.35 or more and a Pcm value represented by Formula (2) is 0.20 or less, with the balance being Fe and incidental impurities,
wherein a metallic microstructure of the line pipe at a ⅛-wall thickness position relative to an inner surface of the line pipe, includes bainite of an area fraction of 85% or more, polygonal ferrite of an area fraction of 10% or less, and martensite-austenite constituent of an area fraction of 5% or less, and
wherein a 0.23% compressive strength of a portion of the line pipe, the portion extending from the inner surface of the line pipe to the ⅛-wall thickness position, in a circumferential direction of the line pipe at a major axis position of the line pipe is 340 MPa or more, a collapse pressure of the line pipe is 35 MPa or more, and a temperature at which a percent ductile fracture of the line pipe measured in a DWTT test becomes 85% or more is-10° C. or less, $$Ceq\ value=C+Mn/6+(Cu+Ni)/15+(Cr+Mo+V)/5 \qquad (1)$$

$$Pcm\ value=C+Si/30+(Mn+Cu+Cr)/20+Ni/60+Mo/15+V/10 \qquad (2)$$

where, in Formulae (1) and (2), the symbol of each element represents the content (mass %) of the element and is zero when the line pipe does not contain the element.

6. The line pipe according to claim 5, the line pipe further comprising, by mass, Ca: 0.0005% to 0.0035%.

7. The line pipe according to claim 5, the line pipe further comprising a coating layer.

8. The line pipe according to claim 6, the line pipe further comprising a coating layer.

9. A method for producing a line pipe, wherein a 0.23% compressive strength of a portion of the line pipe, the portion extending from an inner surface of the line pipe to a ⅛-wall thickness position, in a circumferential direction of the line pipe at a major axis position of the line pipe is 340 MPa or more, a collapse pressure of the line pipe is 35 MPa or more, and a temperature at which a percent ductile fracture of the line pipe measured in a DWTT test becomes 85% or more is −10° C. or less, the method comprising cold forming the steel material for line pipes according to claim 1 into a pipe-like shape; joining butting edges to each other by seam welding; and subsequently performing pipe expansion at an expansion ratio of 1.2% or less to produce a pipe.

10. A method for producing a line pipe, wherein a 0.23% compressive strength of a portion of the line pipe, the portion extending from an inner surface of the line pipe to a ⅛-wall thickness position, in a circumferential direction of the line pipe at a major axis position of the line pipe is 340 MPa or more, a collapse pressure of the line pipe is 35 MPa or more, and a temperature at which a percent ductile fracture of the line pipe measured in a DWTT test becomes 85% or more is −10° C. or less, the method comprising cold forming the steel material for line pipes according to claim 2 into a pipe-like shape; joining butting edges to each other by seam welding; and subsequently performing pipe expansion at an expansion ratio of 1.2% or less to produce a pipe.

11. A method for producing a line pipe, wherein a 0.23% compressive strength of a portion of the line pipe, the portion extending from an inner surface of the line pipe to a ⅛-wall thickness position, in a circumferential direction of the line pipe at a major axis position of the line pipe is 340 MPa or more, a collapse pressure of the line pipe is 35 MPa or more, and a temperature at which a percent ductile fracture of the line pipe measured in a DWTT test becomes 85% or more is −10° C. or less, the method comprising cold forming a steel material for line pipes produced by the method according to claim 3 into a pipe-like shape; joining butting edges to each other by seam welding; and subsequently performing pipe expansion at an expansion ratio of 1.2% or less to produce a pipe.

12. A method for producing a line pipe, wherein a 0.23% compressive strength of a portion of the line pipe, the portion extending from an inner surface of the line pipe to a ⅛-wall thickness position, in a circumferential direction of the line pipe at a major axis position of the line pipe is 340 MPa or more, a collapse pressure of the line pipe is 35 MPa or more, and a temperature at which a percent ductile fracture of the line pipe measured in a DWTT test becomes 85% or more is −10° C. or less, the method comprising cold forming a steel material for line pipes produced by the method according to claim 4 into a pipe-like shape; joining butting edges to each other by seam welding; and subsequently performing pipe expansion at an expansion ratio of 1.2% or less to produce a pipe.

13. The method for producing a line pipe according to claim 9, the method further comprising performing a coating treatment subsequent to the pipe expansion, the coating treatment including heating the pipe such that a temperature of the surface of the pipe reaches 200° C. or more.

14. The method for producing a line pipe according to claim 10, the method further comprising performing a coating treatment subsequent to the pipe expansion, the coating treatment including heating the pipe such that a temperature of the surface of the pipe reaches 200° C. or more.

15. The method for producing a line pipe according to claim 11, the method further comprising performing a coating treatment subsequent to the pipe expansion, the coating treatment including heating the pipe such that a temperature of the surface of the pipe reaches 200° C. or more.

16. The method for producing a line pipe according to claim 12, the method further comprising performing a coating treatment subsequent to the pipe expansion, the coating treatment including heating the pipe such that a temperature of the surface of the pipe reaches 200° C. or more.

* * * * *